UNITED STATES PATENT OFFICE.

EDOUARD NAPOLÉON LAINÉ, OF PARIS, FRANCE.

PROCESS OF PURIFYING GRAPHITE.

1,145,024.  Specification of Letters Patent.  Patented July 6, 1915.

No Drawing.  Application filed January 15, 1914. Serial No. 812,306.

*To all whom it may concern:*

Be it known that I, EDOUARD NAPOLÉON LAINÉ, retired officer, residing at 159 Rue de la Convention, Paris, in the Republic of France, have invented certain new and useful Improvements in Processes of Purifying Graphite; and I do hereby declare the following to be a full, clear, and exact description of the invention, such as will enable others skilled in the art to which it appertains to make and use the same.

This invention relates to a process for treating certain kinds of natural graphite, that allows of converting the same into very pure products. By means of this process products that contain as much as 40% of ash can be converted into products that after combustion leave less than 1.5% of ash.

The treatment of this invention consists in submitting the crude graphite to a preliminary washing with acidulated water, followed by a washing operation with pure water, the graphite obtained in this manner being subsequently heated to a high temperature in the presence of a melted alkali or alkaline carbonate (caustic soda, sodium carbonate, mixture of carbonates of soda and potash), whereupon the product produced by this fusion is submitted to a series of washing operations in very pure water, then in acidulated water and finally, in pure water.

Considered as separate operations the means of operation referred to are known, the invention consists however in having combined the same and determined their successive order under such conditions, that the treatment described must be carefully followed out if the natural graphite is to be converted into graphite leaving less than 1.5% ash after combustion. No result of this kind has as yet been obtained in practice. A considerable number of tests and experiments have shown moreover that in order to obtain the best results in the treatment referred to, certain proportions and temperatures described hereafter have to be complied with.

By way of a preliminary operation the natural graphite is cleaned as far as possible by means of the usual processes *i. e.* by means of a blast or by hydraulic apparatus. The various kinds of natural graphite are preferably classed into various categories by means of shaking tables or sieves before they are submitted to the treatment of this invention. The graphite that has thus been sifted is submitted to the action of a bath of hydrochloric acid of 22° B., to which twice its weight of water is added, so as to dissolve the carbonates and free oxids and eliminate the lime for instance and the iron (*i. e.* the greater part of the same). After a contact of several hours the mixture obtained is washed about three times in a large amount of water and is then dried.

The dried graphite is mixed with a variable amount of alkali or alkaline carbonate. The best result is obtained with solvay sodium carbonate. The mixture must be made in such a manner that the graphite and completely pulverized carbonate or other alkali are thoroughly mixed. It is advisable to sift the mixture when it is taken out of mixing apparatus. The thoroughly homogeneous mixture is then introduced into crucibles of steel or graphite. The final or full temperature should be attained progressively and should be high enough to insure free fusion of the alkaline reagent and its union with the impurities intended to be dissolved and removed. For sodium carbonate a temperature of 1050 degrees C. is suitable. The sodium carbonate can be replaced by a mixture of carbonates of soda and potash or else by caustic soda; these latter products have the advantage of melting at a lower temperature but they are more expensive. On having finished the operation the contents of the crucible, that has been allowed to cool down sufficiently, are thoroughly washed in hot water. The washing in water is carried out at 80° C. and is kept up for several hours, so that no trace of sodium silicate is left. After having washed the graphite ore in the manner described the same is treated with dilute hydrochloric acid (200 liters of acid in 1200 liters of water) at a temperature of 80–90° C. This treatment with dilute acid is intended to dissolve the carbonates of calcium, iron, etc., as well as the sulfids produced during the action on the graphite in the furnace.

The reaction with acid generally lasts at least eight hours and it is of no use to prolong this time of reaction unless the temperature is not maintained at the degree required. The material must be thoroughly and frequently stirred. On having decanted the acid the latter is sent back to the vats for acting on the graphite with acid, the residue is then thoroughly stirred with hot water until the water does not dissolve anything more. The graphite is then washed with cold water and dried by known means i. e. by means of a centrifugal apparatus, a filter press or by letting the graphite fall freely in a hot air drying apparatus. The graphite obtained in this manner ought to leave a residue of ash of less than 1.5% after combustion.

What I claim is:

1. The process of purifying native graphite to obtain a product having a minimum of ash which consists in first washing with dilute acid, then washing with water, then heating with a fused alkali or alkaline carbonate, and then washing successively with water and with dilute acid.

2. The process of purifying native graphite to obtain a product having a minimum of ash which consists in first washing with dilute acid, then with water, then progressively heated with an alkaline carbonate and kept at a temperature of about 1050 degrees C., then washing the resulting product successively with water, and with dilute acid.

In testimony whereof, I have affixed my signature, in presence of two witnesses.

EDOUARD NAPOLÉON LAINÉ.

Witnesses:
    EMILE G. MATHIS,
    HANSON C. COXE.